United States Patent [19]
Shakespear

[11] 4,392,667
[45] Jul. 12, 1983

[54] VEHICLE SUSPENSION SYSTEM

[75] Inventor: Horacio Shakespear, West Bloomfield, Mich.

[73] Assignee: General Motors Corporation, Detroit, Mich.

[21] Appl. No.: 192,729

[22] Filed: Oct. 1, 1980

[51] Int. Cl.³ .............................................. B60G 3/00
[52] U.S. Cl. .................................. 280/690; 280/700; 280/706
[58] Field of Search ....................... 280/690, 700, 706; 180/73; 267/20 A

[56] References Cited

U.S. PATENT DOCUMENTS

| | | | |
|---|---|---|---|
| 3,189,118 | 6/1965 | Arning | 280/190 |
| 3,195,670 | 7/1965 | Dunn | 280/700 |
| 3,876,029 | 4/1975 | Ohe | 280/690 |
| 3,913,932 | 10/1975 | Guerriero et al. | 280/690 |

OTHER PUBLICATIONS

Autorar—Jun. 24, 1966, "Torix Bennett Rear Suspension", pp. 1326, 1327.

*Primary Examiner*—Richard A. Bertsch
*Attorney, Agent, or Firm*—Saul Schwartz

[57] ABSTRACT

An independent rear wheel suspension for an automobile type vehicle wherein each wheel effects negative camber orientation during both jounce and rebound deflection, the suspension including a pair of control arms supported on the vehicle body for pivotal movement about transverse axes of the body, a pair of wheel support members connected at their lower ends to respective ones of the control arms for relative pivotal movement about longitudinal axes of the control arms, and a pair of lateral control rods each having an outboard end connected to a corresponding wheel support member above the control arm connections for universal pivotal movement and to the vehicle body at the center plane thereof also for universal pivotal movement. The lower and upper portions of each wheel support member traverse arcs of substantially infinite and finite, respectively, lateral radii during jounce and rebound so that negative camber orientation is effected.

3 Claims, 6 Drawing Figures

VEHICLE SUSPENSION SYSTEM

BACKGROUND OF THE INVENTION

1. Field of Invention

This invention relates generally to automobile type vehicle suspension systems and more particularly to an improved independent rear suspension system which develops negative wheel camber during both jounce and rebound excursions.

2. Description of the Prior Art

In passenger car suspensions, engineers typically work toward designs which combine desired suspension performance and maximum flexibility of application, minimum space requirement, and maximum economy. With respect to performance, three important suspension characteristics are resistance to dive and squat during braking and acceleration, roll steer during turning maneuvers, and wheel camber control during jounce and rebound excursions. There have, of course, been many systems proposed which are directed specifically to control of some or all of these characteristics. Most pertinently, there has been proposed one suspension system having trailing control arms with wheel spindle supports pivoted to the control arms and another suspension system having laterally extending control arms with wheel spindle supports pivoted to the control arms. In the system having trailing arms, each spindle support is cross connected to the opposite trailing arm so that, while providing negative wheel camber in jounce and rebound, the system is not independent and requires excessive space for the cross connections. In the system having lateral control arms, camber control is effected in accordance with well known principles of four bar linkage arrangements which permit negative wheel camber in jounce and rebound but lack desired economy because of the number of components required. A suspension system according to this invention represents an improvement over these and other known suspension systems.

SUMMARY OF THE INVENTION

The primary feature of this invention is that it provides an improved rear suspension system for an automobile type vehicle. Another feature of this invention is that it provides an improved rear suspension system which is completely independent and adaptable for either driven or non-driven wheel environments. Still another feature of this invention is that it provides an improved independent rear suspension system which is especially suited for sub frame or cradle type installation and which provides maximum flexibility for tailoring to specific applications the suspension characteristics of anti-dive, anti-squat, and roll steer while providing negative wheel camber during both jounce and rebound excursions. A still further feature of this invention resides in the provision in the improved rear suspension system of a pair of trailing arms each of which has a generally vertically oriented wheel spindle support attached for pivotal movement about a longitudinal axis of the control arm and in the provision of a pair of lateral control rods attached at one end to the vehicle near the longitudinal center plane for universal pivotal movement and at the other end to a corresponding one of the wheel spindle supports for universal pivotal movement.

These and other features of this invention will be readily apparent from the following specification and from the drawings wherein.

Figure 1:
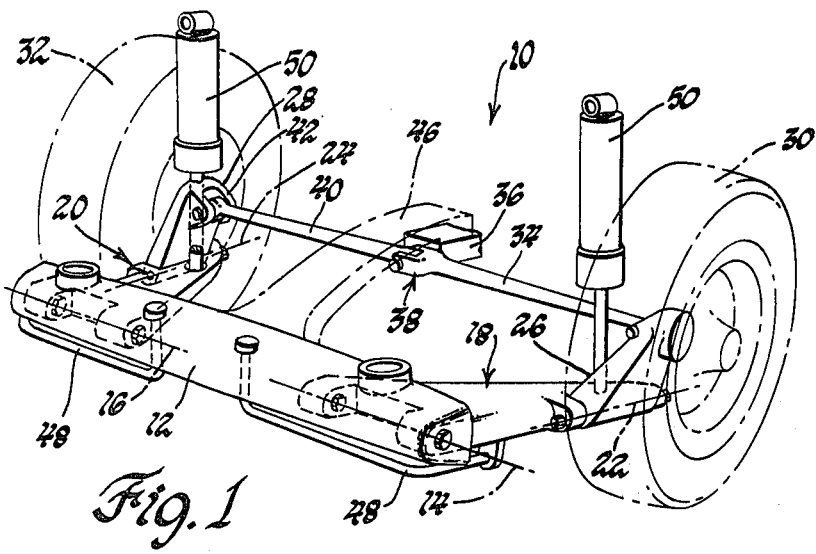
FIG. 1 is a perspective view of a suspension system according to this invention in a non-driven rear wheel environment.

Referring now to FIG. 1 of the drawings, a suspension system according to this invention and designated generally 10 is shown in the environment of an automobile rear suspension of the non-driven type. The suspension 10 includes a rigid subframe member 12 disposed transversely of the vehicle and adapted for attachment by conventional means, as by rubber bushings and the like, to the body portion of the vehicle, not shown. The subframe member 12 incorporates two pairs of conventional pivot forming devices, such as spaced lugs, which define a pair of laterally spaced transverse pivot axes 14 and 16. The pivot axes 14 and 16 are disposed in a common vertically oriented transverse plane of the vehicle but, as described more fully hereinafter, are not necessarily colinear. A left side suspension excursion control arm 18 is supported on the subframe 12 for pivotal movement about pivot axis 14 and a right side suspension excursion control arm 20 is supported on the subframe 12 for pivotal movement about the right pivot axis 16.

Left control arm 18 includes conventional mounting means, not shown, which define an axis 22 disposed longitudinally of the control arm and generally in the plane thereof. Similar mounting means on the right control arm 20 define an axis 24 which extends longitudinally of the control arm 20 generally in the plane thereof. A left side wheel spindle support member 26 is oriented generally vertically and has a lower or first portion connected to the control arm 18 so that the support member is pivotable relative to the control arm about axis 22. As described more fully hereinafter, the lower or first portion of the spindle support member 26 is thus constrained for movement in a generally vertical plane perpendicular to the axis 14 during excursions of the control arm. On the right side, a right wheel spindle support 28 has its lower end similarly connected to the control arm 20 so that the support member 28 is pivotable relative to the control arm 20 about axis 24. The lower or first portion of the support member 28 is thus likewise constrained for movement in a plane perpendicular to axis 16. In the non-driven rear suspension embodiment shown in FIG. 1, each wheel spindle support 26 and 28 carries conventional spindle means, not shown, which rotatably support corresponding ones of a pair of rear road wheels 30 and 32.

With continuing reference to FIG. 1, a left lateral control rod 34 is disposed transversely of the vehicle and is connected at its outboard or left end, not shown, to the spindle support 26 at a second or upper portion of the latter for universal pivotal movement. The inboard or right end of the control rod 34 is connected to the vehicle body, a portion of which is indicated at 36, by a conventional connecting arrangement 38 for universal pivotal movement. The connection between the control rod 34 and the second portion of the spindle support member 26 is spaced vertically above the axis 22 of the control arm 18 so that, as described more fully hereinafter, the second portion of the spindle support member traverses an arcuate path around the universal connection 38 during jounce and rebound excursions of the control arm. On the right side, a right lateral control rod 40 has its inboard end similarly pivotally connected to the vehicle body 36 by the connecting arrangement 38. The outboard end of the control rod 40 is connected to a second or upper portion of the right spindle support member 28 at 42 for universal pivotal movement relative to the latter so that the second portion of the spindle support 28 likewise moves in an arc about universal connection 38. As an alternative to supporting the connecting arrangement 38 on the vehicle body 36, the subframe 12 may be adapted, as by means of a rigid extension 46, shown schematically in FIG. 1, to support the connecting arrangement 38 so that all of the suspension attaching points are located on the subframe, thus facilitating close tolerance control between the various suspension attaching points.

A pair of torsion bar type springs 48 are disposed between the subframe 12 and respective ones of the control arms 18 and 20 and function in well known manner to resiliently resist upward pivotal movement of the control arms in jounce. The springs are calibrated or sized such that with the vehicle at curb weight i.e. carrying its designed-for capacity of passengers, cargo, and fuel, the suspension system assumes an undeflected curb height or central position with the control arms 18 and 20 and the lateral control rods 34 and 40 assuming generally horizontal attitudes as shown in FIG. 1. Respective ones of a pair of conventional shock absorbers 50, shown schematically in FIG. 1, are disposed between the control arms 18 and 20 and the vehicle body to damp suspension excursions of the control arms.

Figure 2:
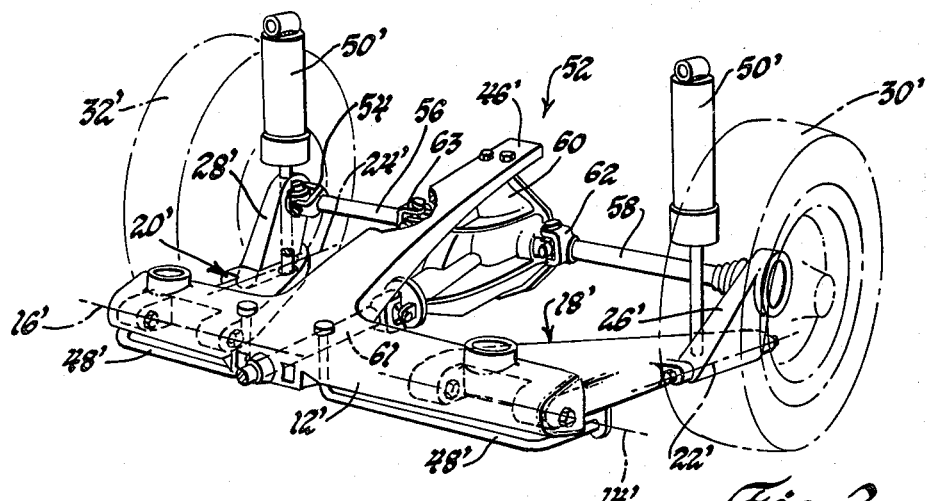
FIG. 2 is similar to FIG. 1 but showing the suspension system according to this invention in a driven rear wheel environment.

Referring now to FIG. 2 of the drawings, a modified suspension system according to this invention and designated generally 52 is shown in the environment of an automobile rear suspension of the driven rear wheel type. The suspension 52 is generally similar to the suspension 10 and, for convenience, the components common to the two suspensions are designated identically except that the components shown in FIG. 2 are differentiated by primed numerals. More specifically, the modified suspension 52 includes a subframe 12' having a rigid rearwardly extending projection 46' integral therewith. The subframe 12' defines a left transverse axis 14' and a right transverse axis 16'. The axes 14' and 16' are disposed in a common vertical transverse plane of the vehicle but are not necessarily colinear. A left control arm 18' is supported on the subframe for pivotal movement about the axis 14' and a right control arm 20' is similarly supported on the subframe for pivotal movement about the axis 16'. Control arm 18' defines a pivot axis 22' and the control arm 20' defines a pivot axis 24'. A left wheel spindle support member 26' has a first or lower portion connected to the control arm 18' for pivotal movement about the axis 22' and a right wheel spindle support member 28' has a first or lower portion connected to the right control arm 20' for pivotal movement about the axis 24'.

In the environment of a rear suspension of the driven wheel type the wheel spindles, not shown, which are rotatably supported in the support members 26' and 28', provide means for attaching the wheels 30' and 32' to the vehicle and for applying torque to the wheels to drive the vehicle. To the latter end, a universal joint assembly 54 is disposed between the spindle on the right side carried by support member 28' and the outboard or right end of a lateral propeller shaft 56. On the left side, a similar universal joint assembly, not shown, is disposed between the spindle carried by support member 26' and the outboard or left end of a lateral propeller shaft 58. The outboard universal joint assemblies exemplified by assembly 54 permit relative universal pivotal movement between the lateral propeller shafts 56 and 58 but rigidly resist relative lateral shiftable movement between the propeller shafts and the support members 26' and 28'.

Referring again to FIG. 2, a differential housing 60 is rigidly attached by conventional means to the extension 46' of the subframe 12'. The housing supports, internally, conventional gearing which divides torque delivered from a longitudinal propeller shaft 61 between a pair of laterally extending side shafts, not shown. On the left, the side shaft projecting toward the wheel 30' is coupled to the lateral propeller shaft 58 by a left inboard universal joint assembly 62 and on the right the side shaft projecting toward wheel 32' is coupled to the lateral propeller shaft 56 by a right inboard universal joint assembly 63. Accordingly, in conventional manner, torque applied to longitudinal propeller shaft 61 is applied to the wheels 30' and 32' to drive the vehicle.

The inboard universal joint assemblies rigidly resist relative lateral displacement between the lateral propeller shafts 56 and 58 and the differential side shafts. Conventional retainer means, not shown, are provided within the differential housing 60 and function to prevent lateral displacement of the side shafts. Accordingly, the lateral propeller shafts 56 and 58 function, through the inboard and outboard universal joint assemblies and the differential side shafts, to laterally locate the wheel spindles and to constrain second or upper portions of the wheel spindle support members 26' and 28' to move in arcuate paths about the inboard universal joint assemblies 62 and 63, respectively. The lateral propeller shafts are thus functionally identical to the lateral control rods 34 and 40 of the non-driven suspension system 10 of FIG. 1 with the exception that the inboard universal joint assemblies 62 and 63 are located on opposite sides of the longitudinal center plane of the vehicle and spaced a relatively short lateral distance therefrom. Optimally, suspension systems according to this invention contemplate lateral control members connected to the body generally at the center plane thereof as in suspension system 10 of FIG. 1. However, as will be seen hereinafter, lateral displacement of the pivotal connections from the center plane effects only a shortening of the radii of the arcs traversed by the second or upper portions of the spindle support members during jounce and rebound excursions. Foreshortening of the arcs traversed does not change the negative camber characteristics and may, in particular applications, be desirable.

With respect to driven rear wheel environments such as shown in FIG. 2, further modified suspension systems according to this invention are suggested. In particular, the fixed differential housing and lateral propeller shaft arrangement of modified suspension system 52 can be functionally replaced, in part, by a differential housing pivotally attached to the body or to extension 46' of subframe 12'. The pivoted differential housing carries a rigidly extending lateral propeller shaft which is pivotally connected to the upper or second portion of one of the spindle support members by an outboard universal joint assembly thereby providing the guidance function of the corresponding lateral propeller shaft of suspension system 52. To accommodate longitudinal displacement, of course, the differential housing can be supported through resilient bushings or the like. On the opposite side, a second lateral propeller shaft has an outboard universal joint connection to the corresponding spindle support member and an inboard universal joint connection located within the differential housing generally on the pivot axis of the differential housing. The second lateral propeller shaft resists lateral displacement and thereby provides the guidance function of the corresponding lateral propeller shaft of suspension system 52. It will be apparent that in the further modified system described economy has been effected by the elimination of one of the four universal joint assemblies necessary in suspension system 52.

Referring now to FIGS. 3 through 6, FIG. 3 is a schematic perspective view of a portion of the non-driven suspension system 10 wherein the components have been reduced, for simplicity, to single line and point contact representations. More particularly, the left control arm 18 includes a radial portion 66 and an integral laterally extending portion 68. Two legs 69 at the forward end of the control arm 18 at opposite ends of and rigid with the lateral portion 68 terminate at hinge connections 70 which allow pivotal movement of the control arm 18 about the transverse axis 14 of the vehicle. The hinge connections 70 resist any other motions of the control arm. The control arm 18 further includes a pair of rigid laterally extending lugs 72 and 74 which support at hinge connections 76 and 78 a first or lower longitudinally extending portion 80 of the spindle support member 26. The spindle support member is thereby mounted on the control arm 18 for pivotal movement about the axis 22 while the lugs and the hinge joints resist any other movement of the spindle support relative to the control arm. The spindle support member 26 further includes a vertically extending section 82 from which rigidly projects a spindle 84 on which the road wheel is rotatably mounted. The vertical section 82 terminates at an outboard universal joint assembly 86 which connects the outboard end of lateral control rod 34 to a second or upper portion of the spindle support member 26 for universal pivotal movement. The second portion of the spindle support member is spaced vertically above the first portion. The inboard end of the lateral control rod 34 terminates at the universal joint connection 38 which connects the lateral control rod to the vehicle body portion 36 for universal pivotal movement.

Figure 3:
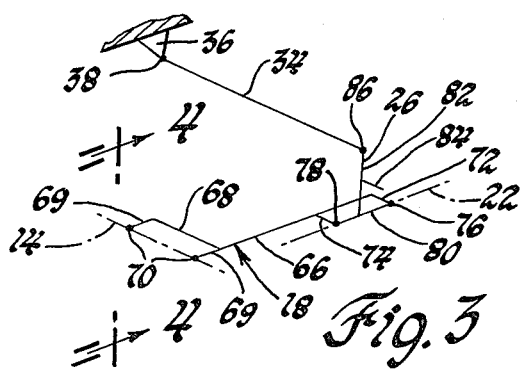
FIG. 3 is a schematic perspective view of a suspension system according to this invention.
Figure 4:
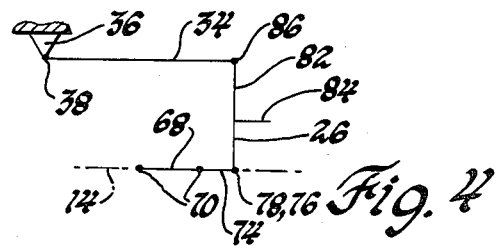
FIG. 4 is a schematic view taken generally along the plane indicated by lines 4—4 in FIG. 3 and showing the suspension system in an undeflected or central position.
Figure 5:
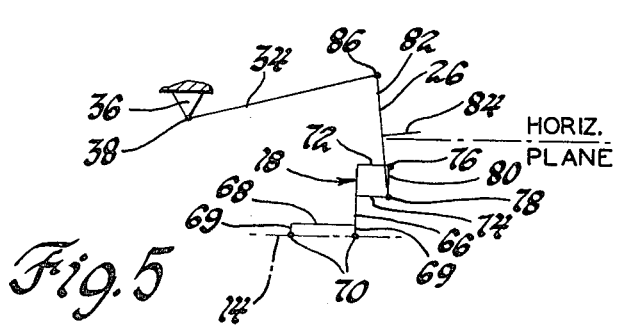
FIG. 5 is similar to FIG. 4 but showing the suspension system deflected in jounce excursion.

Referring to FIG. 4, the schematic suspension system is shown in the central or curb height position corresponding to the vehicle at rest and carrying its design load of passengers, fuel, and baggage. In this position the lateral control rod 34 and the control arm 18 assume generally horizontal attitudes while the spindle support member 26 is disposed generally vertically. In a jounce excursion or deflection, FIG. 5, the control arm 18 pivots upward, counterclockwise in FIG. 3, with the first or lower portion 80 of the spindle support member between the lugs 72 and 74 traversing an arc about axis 14 in a vertical plane. Simultaneously, the vertical section 82 of the spindle support moves upward with the outboard universal joint connection 86 being constrained by the lateral control rod to traverse a path on a sphere having inboard universal joint connection 38 at its center. With respect only to lateral displacement of the first or lower and the second or upper portions of the spindle support member 26 and disregarding the longitudinal displacement thereof, the second portion of the spindle support 26 traverses an arc of finite radius substantially equal to the length of lateral control rod 34. The first portion of the spindle support, however, traverses a vertical path and therefore can be said to be moving on an arc of infinite lateral radius. Accordingly, as seen in FIG. 5, in a jounce deflection the second or upper portion of the spindle support moves inboard of the first or lower portion causing the support member 26 to pivot counterclockwise, FIG. 5, about axis 22 from the vertical orientation assumed at curb height. When the spindle support 26 pivots counterclockwise the spindle 84 is caused to project above the horizontal attitude assumed at curb height thus effecting a negative camber orientation.

Figure 6:
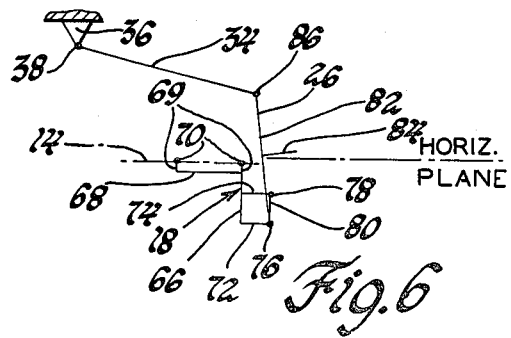
FIG. 6 is similar to FIG. 4 but showing the suspension system deflected in rebound excursion.

Similarly, referring to FIG. 6, in rebound deflection the control arm 18 pivots downward, clockwise in FIG. 3, about the transverse axis 14 causing the first or lower portion of the spindle support member to move in a vertical plane or, as described above, on an arc of infinite lateral radius. Likewise, the second or upper portion of the spindle support member is constrained by the lateral control rod to move in a spherical path about inboard universal joint connection 38 with lateral displacement being along an arc of finite radius substantially equal to the length of rod 34. It is once again seen, then, that in rebound deflection, as in jounce, the second or upper portion of the spindle support moves inboard of the first or lower portion causing the spindle 84 to project above the horizontal attitude and thus effect negative camber once again. Accordingly, it is seen that in both jounce and rebound excursions of the suspension system the wheel spindle 84 and attached wheel effect negative camber orientation.

While only the control of camber has been specifically shown and described, it will be apparent that the suspension system according to this invention can be tailored to also provide anti-squat, anti-dive and roll steel characteristics. More particularly, it will be evident that altering the attitude of the control arms 18 and 20 above or below horizontal at the curb height or central position will alter the longitudinal displacement of the spindle during jounce and rebound deflections. Since anti-dive and anti-squat characteristics are known to be functions of such longitudinal displacement, the designer can, with relative ease, incorporate the desired degree of anti-squat or anti-dive. Similarly, it will be evident that changing the attitude of each of axes 14 and 16 above or below horizontal but still in the vertical plane will cause the spindles, exemplified by spindle 84, to project in front of or behind a transverse plane during jounce and rebound deflections. Since roll steer is known to be a function of such changes, the designer can again, with relative ease, incorporate a desired degree of roll steer into the system.

Having thus described the invention, what is claimed is:

1. In an independent suspension system for a vehicle having a body member, a pair of laterally spaced road wheels, a pair of laterally spaced control arms disposed on said body member for independent pivotal movement in jounce and rebound directions from a central position about respective ones of a pair of pivot axes disposed in a transverse vertical plane of said body member, a pair of spindle support members each adapted to rotatably support a respective one of said road wheels, and hinge means connecting a first portion of each of said spindle support members to respective ones of said control arms for pivotal movement about generally longitudinal axes defined by said respective ones of said control arms so that each of said spindle support member first portions moves in a plane perpendicular to a corresponding one of said pivot axes during jounce and rebound deflections of corresponding ones of said road wheels, the improvement comprising, a pair of laterally extending control means disposed between said body member and respective ones of said spindle support members operative to constrain a second portion of each of said spindle support members spaced vertically above corresponding ones of said first portions to move laterally along an arc of finite radius during jounce and rebound deflections of said road wheels.

2. In an independent suspension system for a vehicle having a body member, a pair of laterally spaced road wheels, a pair of laterally spaced control arms disposed on said body member for independent pivotal movement in jounce and rebound directions from a central position about respective ones of a pair of pivot axes disposed in a first transverse vertical plane of said body member, a pair of spindle support members each defining spindle means for rotatably supporting respective ones of said road wheels, and hinge means connecting a first portion of each of said spindle support members to respective ones of said control arms for pivotal movement about generally longitudinal axes defined by said respective ones of said control arms so that each of said spindle support member first portions moves in a plane perpendicular to a corresponding one of said pivot axes during jounce and rebound deflections of corresponding ones of said road wheels, the improvement comprising, a pair of laterally extending control means disposed in a second transverse vertical plane of said body member in which is also disposed each of said spindle means when said control arms are in said central position, means connecting an outboard end of each of said control means to a second portion of a corresponding one of said spindle support members for relative universal pivotal movement, each of said spindle support member second portions being vertically spaced above the corresponding one of said first portions, and means connecting an inboard end of each of said control means to said body member for universal pivotal movement, said control means thereby being operative to constrain each of said spindle support member second portions to move laterally along an arc of finite radius during jounce and rebound deflections of said road wheels, the combination of movement of said spindle support member first portions in planes perpendicular to said pivot axes and movement of said spindle support member second portion on arcs of finite lateral radii cooperating to effect negative camber orientation of each of said spindle means independently of the other during both jounce and rebound deflections of said road wheels.

3. An improved independent suspension system for an automobile type vehicle having a body member and a pair of laterally spaced road wheels comprising, in combination, a subframe member, means attaching said subframe member to said body member, a pair of laterally spaced control arms, means supporting each of said control arms on said subframe for pivotal movement in jounce and rebound directions from a central position about respective ones of a pair of pivot axes disposed in a first transverse vertical plane of said body member, a pair of spindle support members each having a spindle for rotatably supporting corresponding ones of said road wheels, hinge means connecting a first portion of each of said spindle support members to corresponding ones of said control arms for pivotal movement about generally longitudinal axes of said corresponding control arms so that each of said spindle support member first portions moves in a plane perpendicular to a corresponding one of said pivot axes during jounce and rebound deflections of corresponding ones of said road wheels, a pair of laterally extending control rods disposed in a second transverse vertical plane of said body member in which is also disposed each of said spindles when said control arms are in said central position, means connecting an outboard end of each of said control rods to a second portion of a corresponding one of said spindle support members for relative universal pivotal movement, each of said spindle support member second portions being vertically spaced above the corresponding one of said first portions, and means connecting an inboard end of each of said control rods to said body member at the longitudinal center plane thereof for universal pivotal movement so that each of said spindle member second portions is constrained to move laterally along an arc of finite lateral radius during jounce and rebound deflections of said road wheels, the combination of movement of said spindle support member first portions in planes perpendicular to said pivot axes and movement of said spindle support member second portions on arcs of finite lateral radii cooperating to effect negative camber orientation of each of said spindles independently of the other during jounce and rebound deflections of said road wheels.

* * * * *